Figure 5:
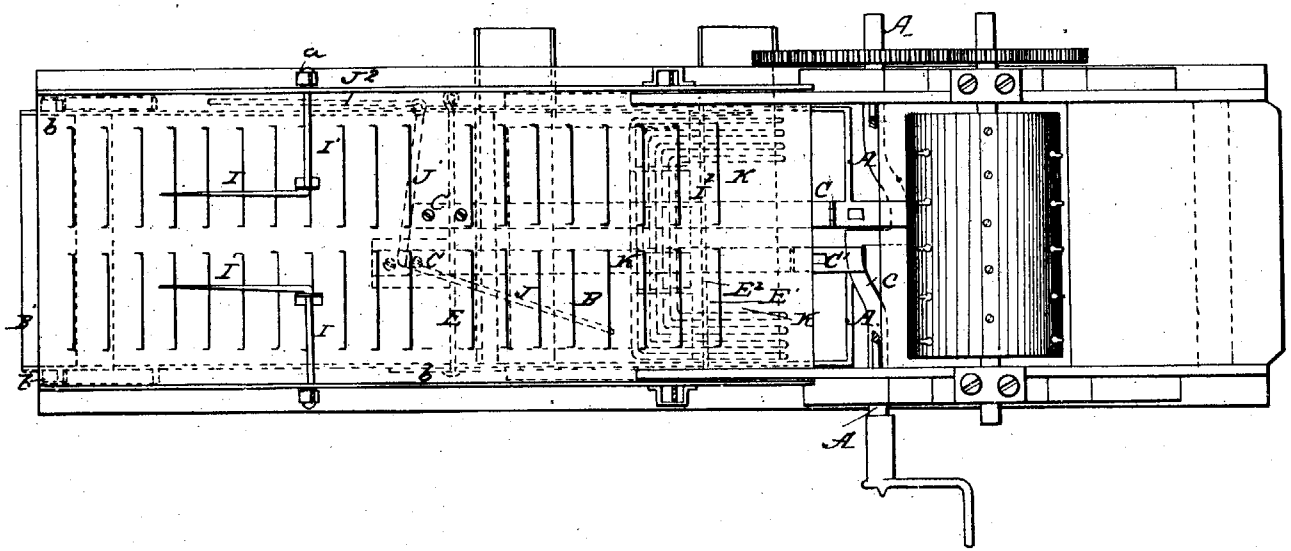

2 Sheets—Sheet 1.
I. HART.
Machine for Thrashing and Cleaning Grain.
No. 3,474. Reissued June 1, 1869.
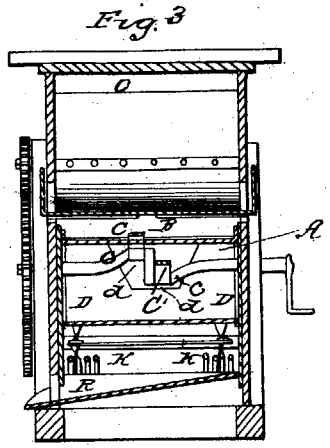
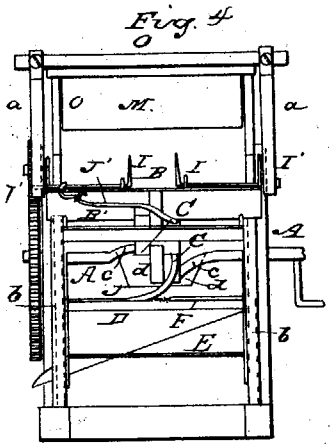
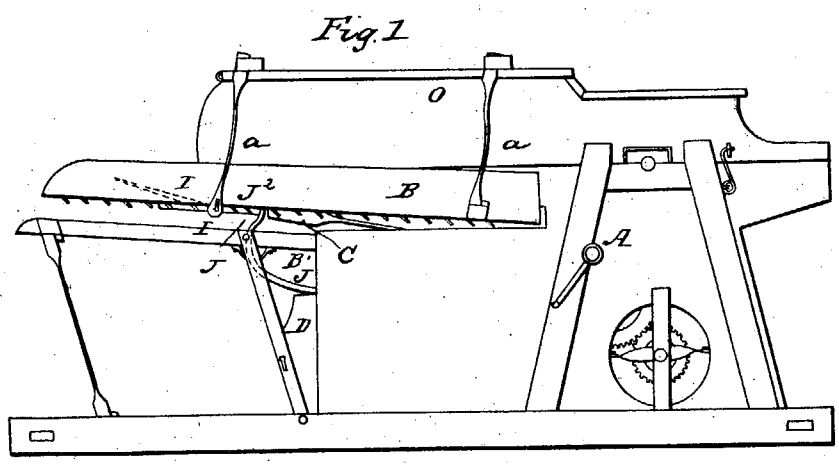
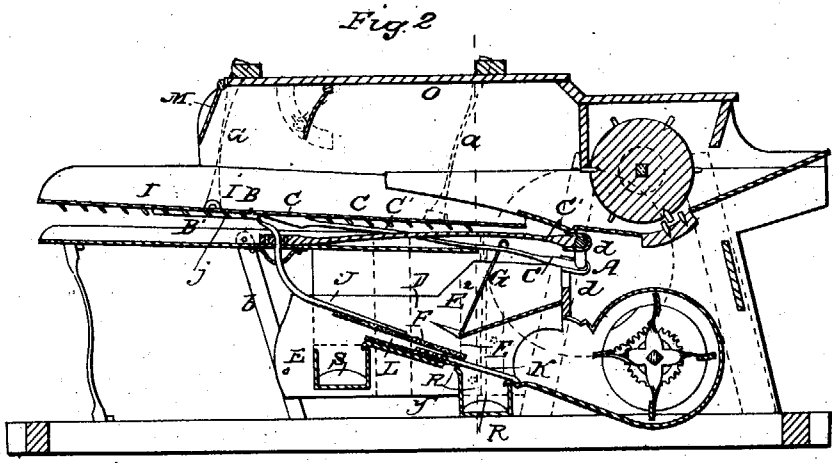
WITNESSES
Benjamin G. Wilson
INVENTOR
Ira Hart
by Munn & Co
Attorneys
N. PETERS, Photo-Lithographer, Washington, D. C.

I. HART.

2 Sheets—Sheet 2.

Machine for Thrashing and Cleaning Grain.

No. 3,474.

Reissued June 1, 1869.

WITNESSES
Geo. H. Graves
Geo. H. Ashton

INVENTOR
Ira. Hart
by Munn & Co
Attorneys

N. PETERS, Photo-Lithographer, Washington, D. C.

UNITED STATES PATENT OFFICE

CORNELIUS AULTMAN, OF MANSFIELD, OHIO, ASSIGNEE, BY MESNE ASSIGNMENTS, OF IRA HART.

IMPROVEMENT IN MACHINES FOR THRASHING AND CLEANING GRAIN.

Specification forming part of Letters Patent No. 29,374, dated July 31, 1860; Reissue No. 3,474, dated June 1, 1869.

*To all whom it may concern:*

Be it known that IRA HART, of Clarksburg, in the county of Harrison and State of Virginia, invented certain new and useful Improvements in Machines for Thrashing and Cleaning Grain, of which the following is a full, clear, and exact description, reference being had to the accompanying drawing, forming part of the specification, in which—

Figure 1 is a side elevation of said improved machine. Fig. 2 is a vertical longitudinal section of same. Fig. 3 is a vertical transverse section of same. Fig. 4 is a front view of the same, and Fig. 5 is a plan view with the cap removed.

Similar letters of reference indicate corresponding parts in all the figures.

The nature of the invention will be fully understood from the following description of its construction and operation.

The thrashing-cylinder and fan are arranged in the usual manner, and therefore need not be described.

A represents the driving-shaft, provided with two cranks, *c c*, and arranged in front of and somewhat below the thrashing-cylinder. C C′ are two elastic connecting-rods, connecting the vibrating tables B B′ with the cranks *c c*.

The table B is suspended by means of elastic links or hangers *a a*, attached to the frame of the machine, the upper ends of said links being inclined toward the thrashing-cylinder, so that the table B acquires throughout the entire extent of its forward throw an accelerated upward movement, while the table B′, supported upon arms *b b*, secured at their lower ends, but inclined in an opposite direction, acquires its upward movement during its backward or inward throw.

Just above the upper table, and suspended upon rotating shafts from the inside of the cap *o* of the machine, are two straw arresters or deflectors, M N. The arrester or deflector N is made concave in form, and may be adjusted by means of the arm and set-screw. (Shown in dotted lines at N, Fig. 2.)

Having one of the arresters or deflectors adjustable is found to be very useful in thrashing grain of different kinds and in different conditions.

The arrester M hangs loosely, and does not impede the passage of the straw, but prevents any flying grain from passing out.

On top of the upper screen or table, and near its front end, are two lifting rods or fingers, I, which stand at right angles to the axles I′, with which they turn. These fingers play up and down as the table vibrates, said motion resulting from the axles of the fingers being attached to the lower ends of suspension bars or links *a a*, said links, as they approach a horizontal position, rotating the axles of the fingers, thereby compelling said fingers to rise, and as the links return to their original position they compel the fingers to descend.

Below the second table, B′, is arranged a grain-cleaning shoe, D. The shoe has two sieves or screens, F L, and is suspended by means of swinging bars G and transverse bars E $E^1$, the rod E having its bearing in the pivoted supports *b b* of the lower table, and the rod $E^1$ having its bearings in the frame of the shoe. Over the sieve F is arranged a series of lifting-fingers, $E^2$, said fingers being attached to the rod $E^1$. Over the sieve L is a series of square open stationary scrapers, K, arranged as shown in Figs. 5, 2, and 3; and underneath the sieves F and L are arranged transverse discharge-spouts R S.

By having the shoe and fingers arranged as above described, it is obvious that when the shoe moves back and forth the fingers will necessarily rise and fall, thus lifting and opening up the substances which may be on the first screen; and while the fingers are performing this operation the stationary scrapers, by reason of the lower screen passing under them, are acting to keep said screen clean.

In order to keep the meshes of the first screen of the grain-cleaning shoe open, an arm, J, is arranged just above the surface of the same, said arm being parallel with the screen, but having a vertical axis, which turns in an opening in the bottom of the second table, B′, and is connected with the bottom of the first table, B, by means of an arm, $J^1$, and a connecting-rod, $J^2$, as represented. By thus arranging the arm J, it is evident that, as the tables move back and forth, the arm J has a lateral vibratory movement imparted to it, and is thus caused to continually sweep the surface of the screen F.

As fast as the grain is cleaned it is discharged into the spout R, the unthrashed heads descending into the spout S.

In order to make the utility of this machine apparent, the following description of its operation is given: The power is applied to the driving-shaft in any usual or desired manner, and the grain is fed to the cylinder, as is customary in other machines. After passing the cylinder, the grain and straw are thrown against the cap *o* and deflector N, and by them turned upon the separating-table B. As the grain and straw approach the outer end of the platform B, the grain is delivered, through slots or openings in said table, to the lower table, B′, the straw meanwhile being thoroughly agitated and shaken by the fingers I, thus detaching any grain which may be clinging to it. The grain and such chaff as may have fallen through the upper table are then carried by the lower table to the chute-board, whence it is sifted into the upper screen, F, having the same motion that a skillful operator gives to a hand-sieve; and, by reason of the arm J vibrating over the screen, any improper accumulation of foreign substances is prevented and the necessity of a hand in thrashing is avoided. The grain now passes to the lower screen, and the stationary scrapers break and clean off such fragments of heads and straws as may pass through the upper sieve and are inclined to stick into and choke the lower one.

The cleaned grain is discharged at the spout R and the unthrashed heads at the spout S. The amount delivered here depends upon and is regulated by the position of the upper screen. The cheat, cockle, and other small impurities pass out at the opening *y* below.

The concave form given to the deflector N is found advantageous, for the reason that the change made in the direction in which the grain and straw are thrown when they scrape from the thrashing-cylinder is less abrupt; consequently there is less injury to the grain and straw.

Another point gained by the construction described is this: It has always been a serious complaint against this class of separators that they are subject to a severe racking, occasioned principally in this manner: The table, when thrust forward, is at the same time raised, so that when it is drawn backward it falls, and, of course, acquires a considerable momentum thereby. Now, if it (the platform) could swing past a point perpendicular to the point of its suspension, this momentum would be expended in carrying the table nearly as high on the other side; but such a construction being impracticable, and as it is necessary to check the descent of the platform as soon as or even before it has reached the lowest point in the arc which it is describing, it follows that the machine itself must sustain a shock equivalent to the momentum acquired by the platform; but by the method of supporting them herein described—that is, in such manner that they rise and fall simultaneously when moving in opposite directions—the shock imparted by one is neutralized by that given by the other, and the crank-shaft sustains the entire blow or strain.

A further advantage possessed by this machine is this: that although the platforms move in opposite directions at the same time, yet they both have their upward motion while moving in the direction in which the grain is intended to move over each platform.

The small amount of gearing required and the total absence of belts and pulleys are other advantages, which will be appreciated without further description, especially in a machine which is expected to run without shelter.

What is claimed, and sought to be secured by Letters Patent, is—

1. The combination, in a grain-separator, of two separating platforms or shakers which move in opposite directions, and are supported by or mounted upon vibrating links or arms in such manner that both of said platforms shall rise during the entire extent of their throw in one direction and fall during the entire extent of their throw in an opposite direction.

2. In a grain-separator having two separating platforms or shakers suspended or supported in such manner that they rise throughout the entire extent of their throw in one direction and fall throughout their entire throw in an opposite direction, operating said platforms in such manner that they shall rise and fall simultaneously.

3. The combination, in a grain-separator, of two separating platforms or shakers and lifting rods or fingers, for lifting the straw from the platform, over which it passes after leaving the thrasher.

4. The combination, in a grain-separator, of a concave deflector and a lifting separating-platform provided with lifting rods or fingers.

5. The scrapers K, which sweep the lower screen, when constructed with three sides and arranged as shown, for the purpose set forth.

6. The combination of a stationary adjustable deflector, N, with a swinging one, M, in the cap O of the machine, as set forth.

CORNELIUS AULTMAN.

Witnesses:
J. W. JEUNER,
V. GUTZWILLER, Jr.